Patented Sept. 10, 1946

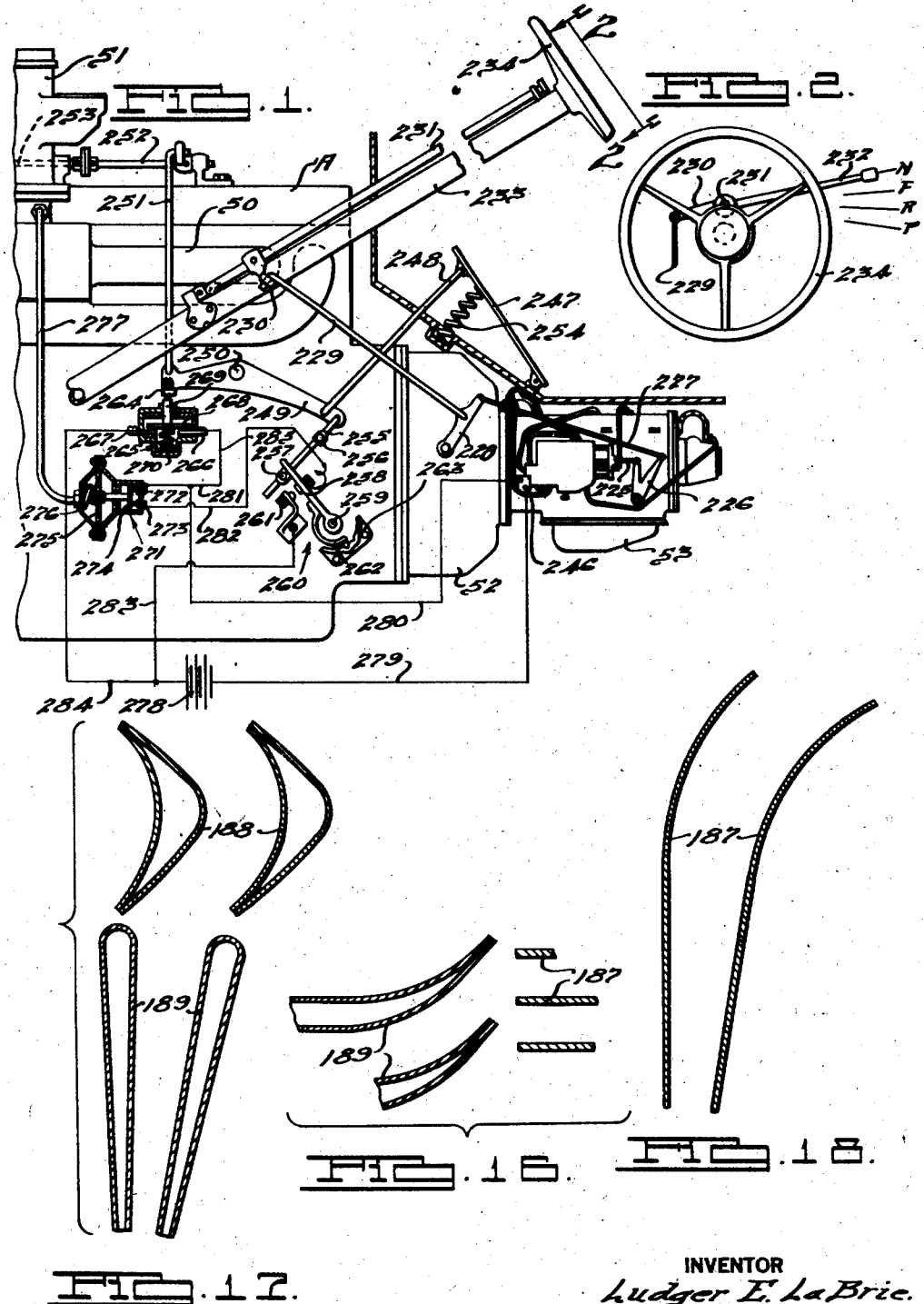

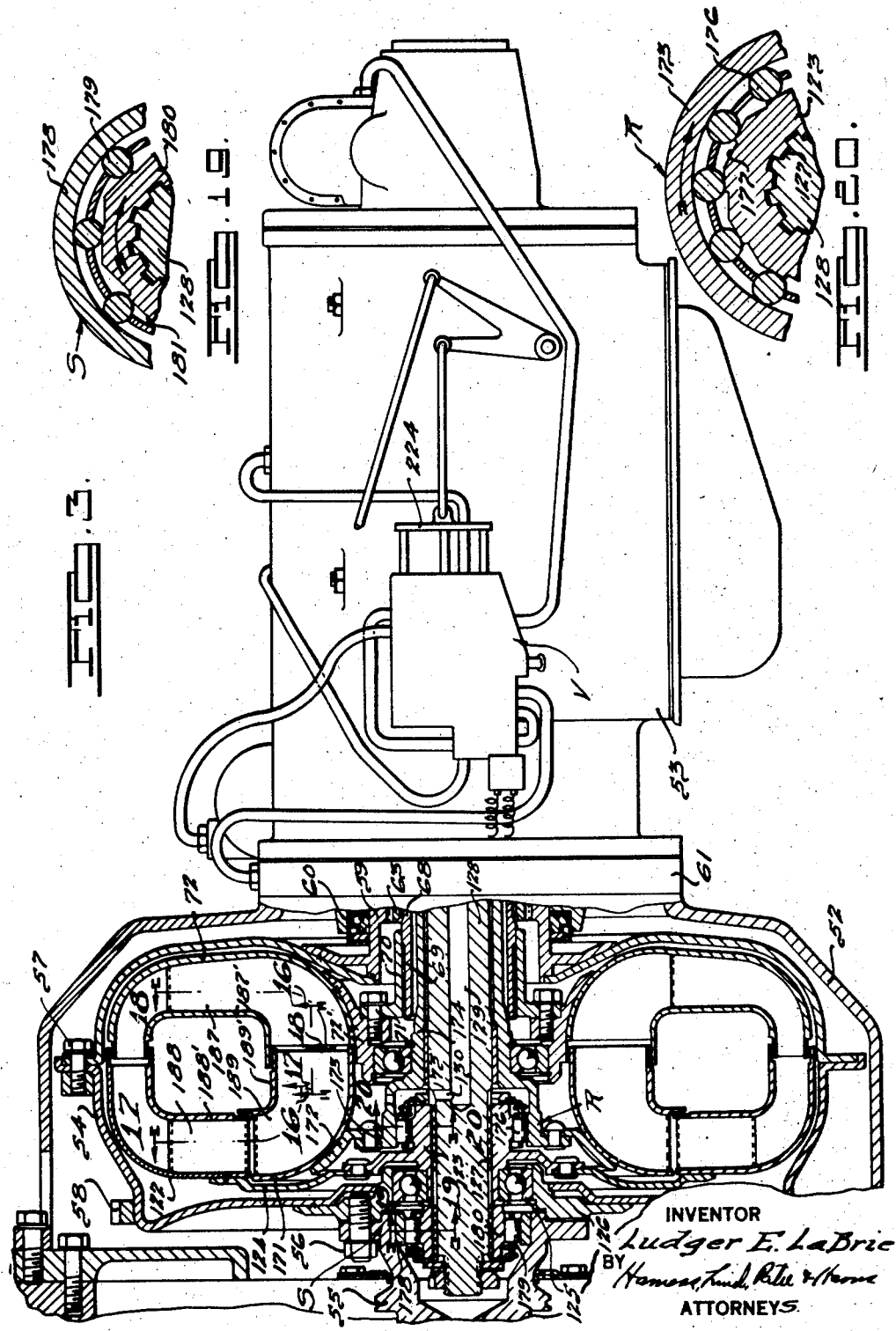

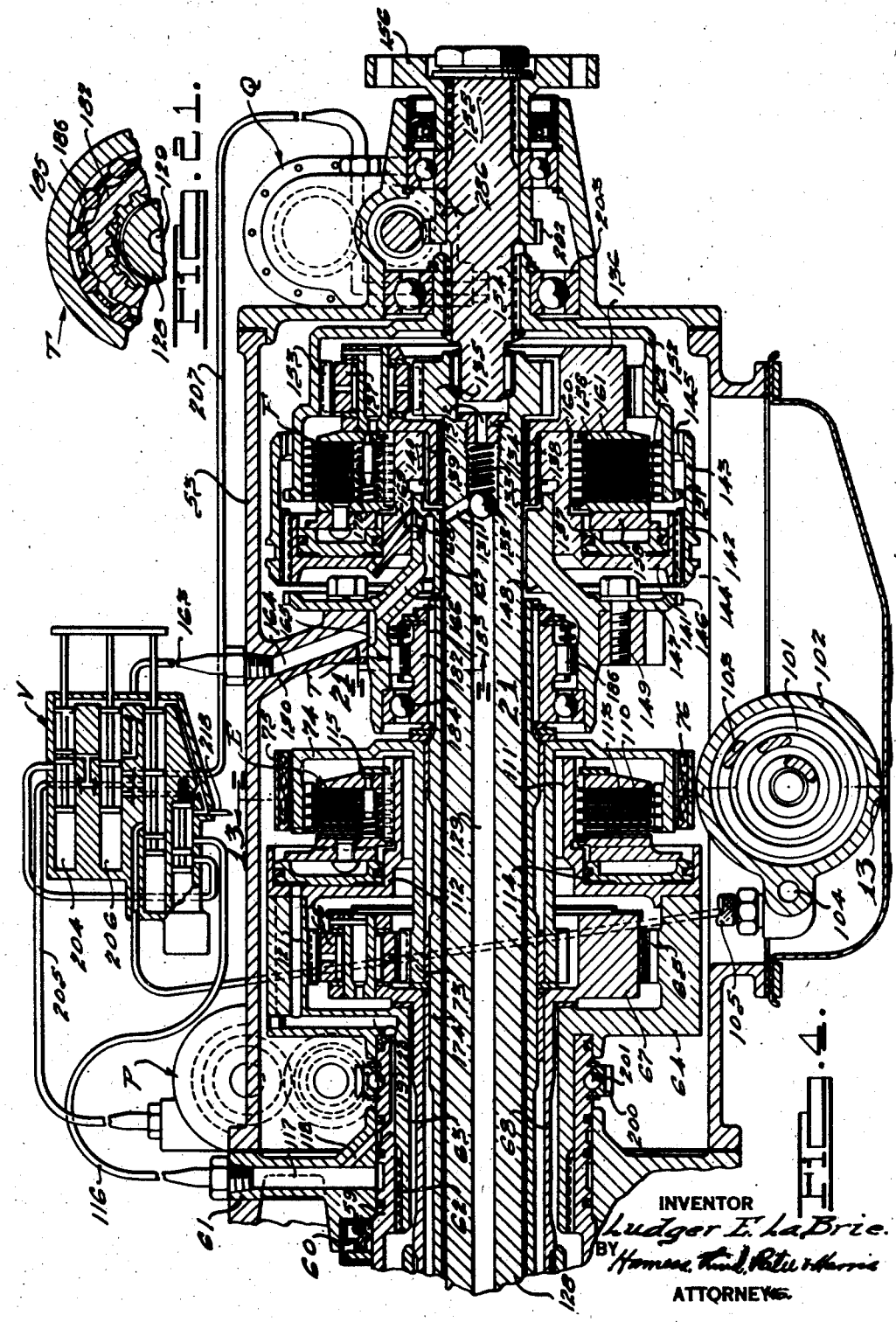

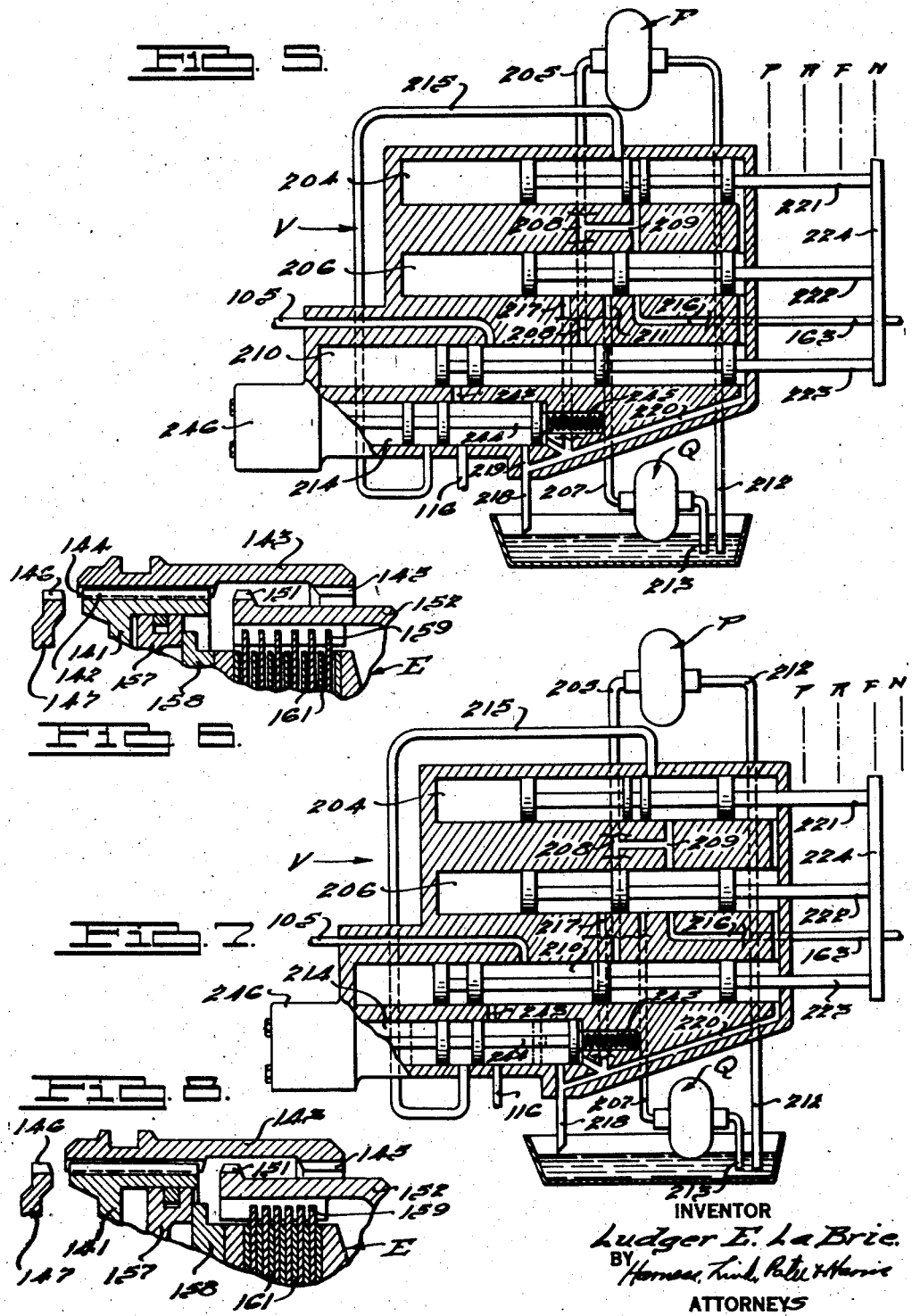

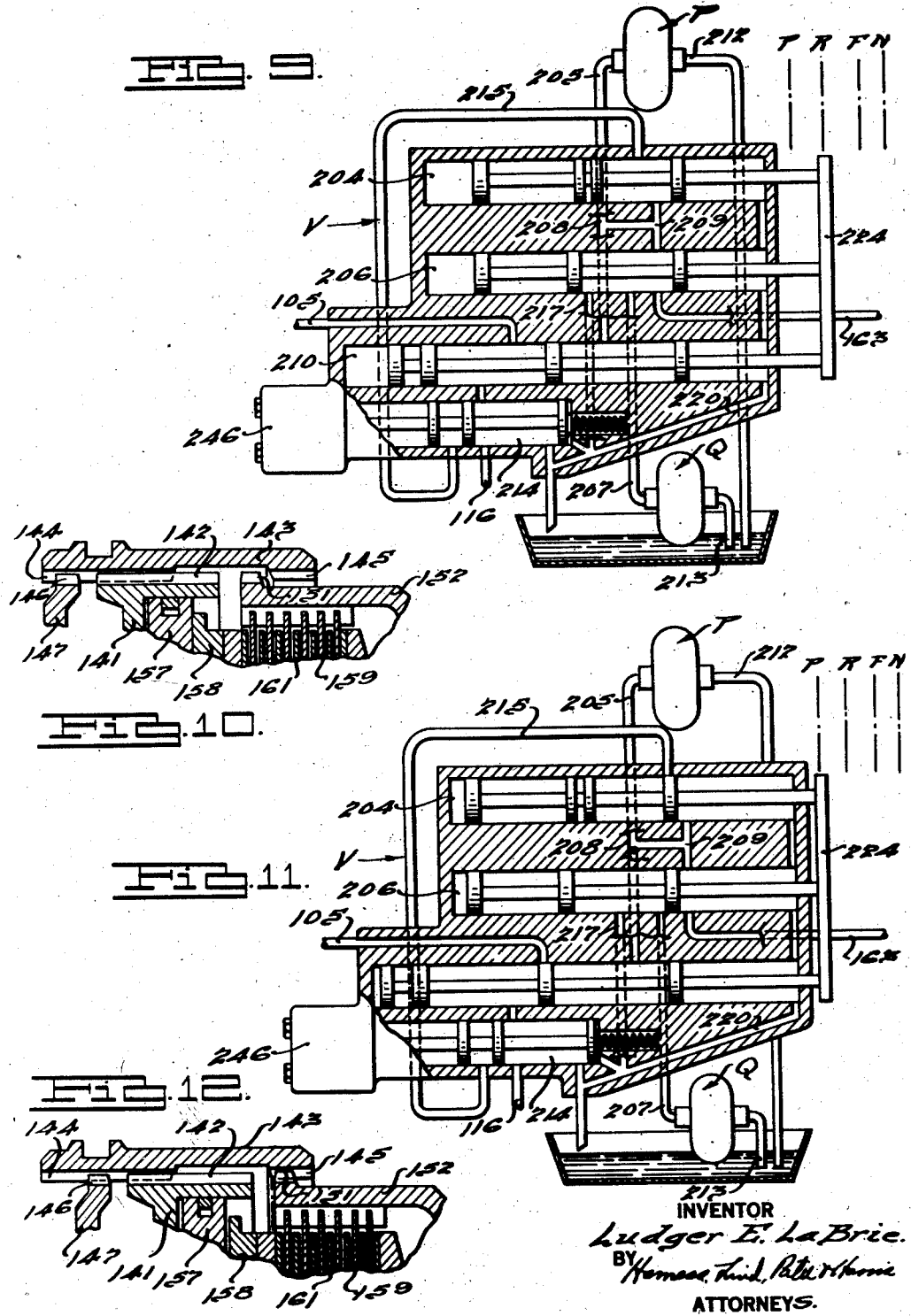

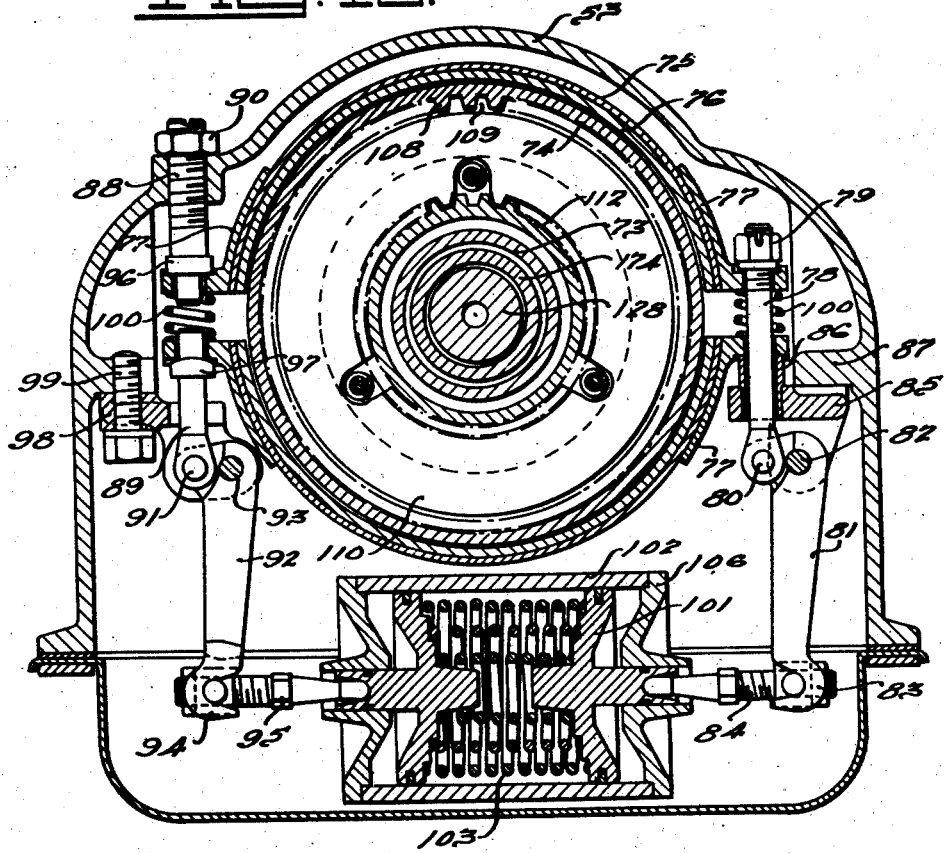
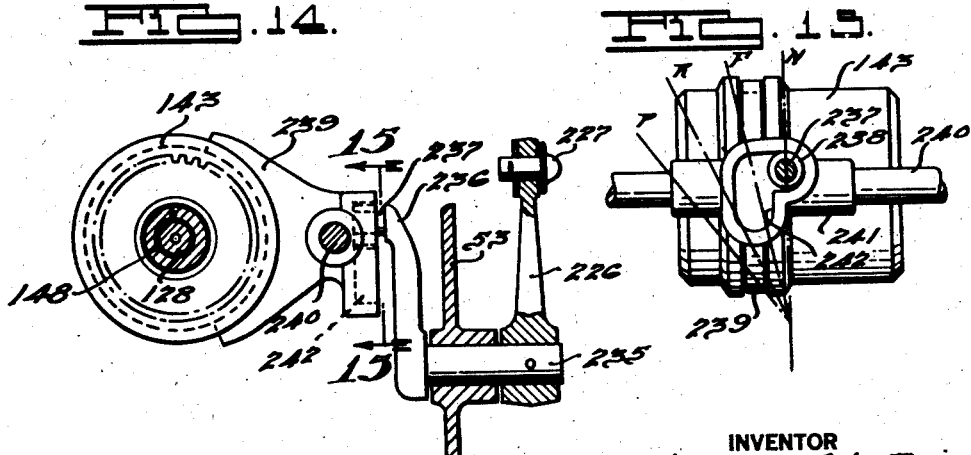

2,407,289

UNITED STATES PATENT OFFICE 2,407,289

POWER TRANSMISSION

Ludger E. La Brie, Detroit, Mich., assignor to Chrysler Corporation, Highland Park, Mich., a corporation of Delaware Application December 4, 1941, Serial No. 421,536

45 Claims. (Cl. 74—472)

This invention relates to power transmissions and particularly to motor vehicle power transmissions of the type including a hydraulic torque converter.

Heretofore various attempts have been made to adapt the hydraulic torque converter to motor vehicle use, but these attempts have never been successful from the commercial standpoint principally because of the high cost and lack of flexibility of the torque converter, its low efficiency at cruising speeds, and the tendency for vehicles so equipped to creep at engine idling speeds.

Accordingly, it is the principal object of my invention to provide an improved form of hydraulic torque converter which is easier and less costly to manufacture than former types and which is flexible in operation.

Another object is to provide a transmission for use in conjunction with the torque converter which provides anti-creep means effective when the engine is idling and which incorporates a kickdown reduction gear brought into operation at the will of the operator for providing increased acceleration at cruising speeds.

A further object is to provide a suitable control system for the transmission which will render the operation automatic for all normal driving.

A still further object is to provide means for positively locking the drive wheel of the vehicle against rotation when parked.

Other objects and advantages will become apparent from the following description which discloses a preferred embodiment of the invention.

In the drawings accompanying the description,

Fig. 1 is a partial elevation of a motor vehicle power plant embodying the present invention.

Fig. 2 is a plan view of the steering wheel and shift lever taken as indicated by line 2—2 of Fig. 1.

Fig. 3 is an enlarged elevation of the transmission with part of the casing broken away to show details of the torque converter.

Fig. 4 is an enlarged vertical section of the gearbox, a section of the control valve on a smaller scale being shown to illustrate the hydraulic circuit.

Fig. 5 is a diagrammatic sectional view of the control valve in neutral position.

Fig. 6 is a fragmentary section of the main transmission control clutch sleeve, the position thereof corresponding to the position of the valve in Fig. 5.

Figs. 7 and 8 are views similar to Figs. 5 and 6 respectively showing the parts in forward driving position.

Figs. 9 and 10 are similar views showing the parts in reverse driving position.

Figs. 11 and 12 are similar views showing the parts in parked position.

Fig. 13 is a section taken along the line 13—13 of Fig. 4.

Fig. 14 is a detail of the clutch sleeve shifting mechanism.

Fig. 15 is an elevation of the Fig. 14 apparatus taken as indicated by the line 15—15.

Figs. 16, 17 and 18 are sectional views of the converter vanes taken as indicated by the lines 16—16, 17—17 and 18—18 of Fig. 3.

Figs. 19, 20 and 21 are detail sections of the overrunning devices taken as indicated by the lines 19—19 and 20—20 of Fig. 3 and line 21—21 of Fig. 4.

Referring now to Figs. 1 to 4, inclusive, it may be seen that the invention is embodied in a vehicle power plant comprising an engine A provided with the usual intake manifold 50 and carburetor 51. Bolted to the rear of the engine block is the torque converter housing 52 and to the rear end of this housing is bolted the gear housing 53.

The torque converter has a rotatable shell 54 which is bolted to the crankshaft 55 of the engine by bolts 56. The shell 54 is split centrally for assembly purposes and the two halves are bolted together by bolts 57. The forward half carries the starting ring gear 58 and the rear half is welded to a sleeve 59 which extends rearwardly into the casing 53, a seal 60 being disposed between the sleeve 59 and an adapter plate 61 which is inserted between the housings 52 and 53.

The sleeve 59 is splined at 62 to the forwardly extending portion 63 of an annulus gear member 64. The latter is provided with teeth 65 which mesh with planet gears 66 carried by a carrier 67, and the carrier has a forwardly extending sleeve portion 68 splined at 69 to a hub 70 bolted at 71 to the impeller hub 72'.

The sun gear 73 of the planetary train has a rearwardly extending sleeve which terminates in a brake and clutch member 74. The external periphery of this member is adapted to be engaged by a brake band 75 provided with the usual lining 76 (Fig. 13). The band 75 is split into two parts which have lugs 77 welded thereto at their respective end portions. On one side, the lugs 77 of the respective band portions are loosely engaged by a bolt 78 which passes through coaxial bores formed in the lugs to accommodate the bolt. A lock nut 79 is threaded on one end of the bolt and the other end is formed with a hole for receiving a pivot pin 80 by means of which the bolt 78 is fastened to the shorter arm of a bellcrank 81. The latter is pivotally mounted in the casing by a pivot 82 and the longer arm thereof is formed at its end with a hook 83 which engages a push rod 84. A lug 85 fixed to the casing projection 87 supports the pivot 82 and guides the bolt 78 by means of a sleeve 86.

On the opposite side, the brake band portions are provided with similar lugs 77 which are engaged by the pins 88, 89. The pin 88 is threaded in the casing and has an adjustment lock nut 90. The pin 89 is pivotally connected at 91 to a bellcrank 92 which is pivoted on the casing at 93 by means of a lug 98 fastened to the casing by cap screw 99. The bellcrank has a hook 94 disposed in engagement with a push rod 95. Each of the pins 88, 89 has integral lugs 96, 97 which engage the respective lugs 77 as can be clearly seen in Fig. 13.

A pair of coil springs 100 urge the brake band portions apart to permit free rotation of the member 74 when the brake is not applied. The push rods 84 and 95 are respectively controlled by a pair of pistons 101 slidably disposed in a cylinder 102 mounted in the lower portion of the casing. The pistons are of stepped construction for accommodating a series of coil springs 103 which act to urge the pistons away from each other and thus tighten the brake band 74 about the drum portion of the member 74 through the intermediary of the bellcranks 81, 92 as will be readily understood.

Pressure fluid is supplied to the cylinder 102 through a passage 104 and a pipe or conduit 105 (Fig. 4) as will be explained, it being clear that as the pressure fluid is introduced into the cylinder between the pistons 101 and the cylinder heads 106, the pistons will move toward each other to thereby compress the springs 103 and release the brake band 75.

The brake and clutch member 74 is provided on its inner periphery with spline teeth 108 (Fig. 13) which mesh with spline teeth 109 formed on clutch plates 110 of which there are several as illustrated in Fig. 4. Fixed to the rear end of the annulus gear 64 is an extension 111 in which is formed an annular fluid cylinder 112. The extension 111 extends rearwardly of the cylinder in the form of a toothed annulus and carries a plurality of clutch plates 113 which are interleaved with the plates 110. The plates 110 and 113 constitute parts of a friction clutch E which is hydraulically controlled.

An annular piston 114 is slidably disposed in the cylinder and bears on the first and last of the clutch plates 113 which are thicker than the center plates as can be seen from Fig. 4. A snap ring 115 prevents rearward shift of the rear clutch plate 113 thus it can be seen that when pressure fluid is admitted to cylinder 112 the piston 114 will move rearwardly and compress the plates 113 which will grip the plates 110 and establish a driving connection between the annulus gear 64 and the sun gear 73.

The cylinder 112 is supplied by a pipe 116 through passages 117, 118, 119, 120 and 121, the last two being carried by the annulus gear as illustrated in Fig. 4.

From the description so far, it will be seen that the impeller wheel 72 is driven at engine speed or at a speed slower than engine speed depending upon the condition of the brake and clutch mechanism just described. If the brake band 75 is applied, the member 74 will be held stationary and the sun gear 73 will likewise be stationary whereupon a reduced speed drive will be transmitted to the impeller by means of the shell 54, sleeve 59, sleeve portion 63, annulus gear 64, carrier 67, carrier sleeve portion 68 and hub 70. On the other hand, if band 75 is free and pressure is on in clutch control cylinder 112, the annulus gear 64 will be locked to the sun gear 73 and a 1 to 1 ratio drive will be transmitted from the shell 54 to the impeller 72. The fluid control system for controlling the brake and clutch mechanism will be described below.

Arranged in juxtaposition with the impeller is a runner or turbine wheel 122. This wheel is mounted on a hub 123 through the intermediary of an annular plate 124, an anti-friction thrust bearing 125 being disposed between the hub and a hub member 126 to which the shell 54 is welded.

The hub 123 is splined at 127 to a shaft 128 which extends a considerable distance rearwardly of the transmission. The shaft 128 is provided with a bore 129 which connects with the interior of the torque converter by means of a passage 130. At the rear end of the shaft the bore 129 is enlarged for the reception of a check valve consisting of a ball 132 urged onto a seat by a coil spring 133 which is retained in place by a nut 134. If the pressure of the fluid in the converter becomes unduly high, due to heating under overload conditions for example, the ball 132 will be moved off its seat and the pressure will be relieved through passage 131'.

Formed integrally on the extreme rearward end of the shaft 128 is a sun gear 135 which forms an element of a rear planetary gearset. The carrier 136 of this gearset mounts the planet gears 137 and has a forwardly extending sleeve 138 which is journalled on the shaft 128 and externally splined at 139 to an annular member 140. The latter is formed with a fluid cylinder 141 and has clutch teeth 142 on its outer periphery. A clutch sleeve 143 is slidably carried by the teeth 142, this sleeve having two longitudinally spaced sets of teeth 144, 145. The teeth 144 mesh with the teeth 142 and the sleeve 143 is adapted to be shifted to engage the teeth 144 with a set of clutch teeth 146 formed on a stationary member 147 secured to the casing by cap screws 149, the casing having an integral internal extension 150 for receiving the stationary member.

The sleeve teeth 145 are adapted to mesh with a set of clutch teeth 151 formed on the outer periphery of an annulus gear 152 which forms an element of the gearset and is bell-shaped and elongated as illustrated in Fig. 4 to accommodate the teeth 151. The annulus gear 152 has gear teeth 153 and is splined at 154 to a tailshaft 155, the latter being adapted for connection by means of a member 156 with the propeller shaft as is usual in automotive practice.

The cylinder 141 carries an annular piston 157 which bears on an annular washer 158, the latter in turn bearing on the first of a set of clutch plates 159 splined at 160 to the member 140. Interleaved with the plates 159 are plates 161 splined at 162 to the annulus gear 152. Fluid under pressure is conducted into the cylinder 141 from the main control valve V through conduit 163, passage 164 formed in casing extension 150, passages 165, 166, 167, 168 formed in stationary member 148 and passage 169 formed in annular member 140.

When pressure is "on" in cylinder 141, the clutch plates 159, 161 are pressed together and carrier 136 is clutched to annulus gear 152 thereby providing a 1 to 1 ratio driving connection between shafts 128 and 155. A set of coil springs 170 separates the clutch plates when there is no pressure on in the cylinder.

When the sleeve 143 is in "neutral" position and no pressure is on in cylinder 141 (Figs. 4 and 6), no drive is transmitted from shaft 128 to shaft 155 or vice-versa because there is no reaction point in the planetary gearing, the carrier 136 rotating freely. For convenience, the rear clutch will be designated F.

When pressure is on in cylinder 141 and sleeve 143 is in "neutral" (Fig. 8), the carrier 136 is clutched to the annulus 152 and a direct, two-way drive is established between shafts 128 and 155.

When pressure is "off" in cylinder 141 and sleeve 143 is shifted forwardly to mesh the sleeve teeth 144 with the teeth 146 of stationary member 147 (Fig. 10) the carrier 136 is positively locked against rotation and reverse drive will be transmitted from shaft 128 to shaft 155.

When pressure is off in cylinder 141 and sleeve 143 is shifted forwardly to its extreme forward position (Fig. 12), the sleeve teeth 145 mesh with the teeth 151 on annulus gear 152 and the shafts 128 and 155 are locked against rotation, both shafts being locked to the stationary member 147. This is the "park" position of sleeve 143 and renders a parking brake unnecessary as well as providing a positive, non-slip brake.

The mechanism for controlling shift of the sleeve 143 and admission of fluid to cylinder 141 will be described below.

Returning now to Fig. 3, it will be seen that a third hydraulic element 171 is disposed in the shell 54 in juxtaposition with respect to the impeller 72 and runner 122. The third wheel 171 is a guide or reaction wheel and is welded to an annular member 172 which is in turn riveted to the forwardly extending bell-shaped portion 173 of a hollow shaft 174. An anti-friction bearing 175 rotatably journals the shaft 174 in the impeller hub 72' and between the shaft 174 and the runner hub 123 is disposed a set of rollers 176 forming part of an overrunning driving connection R. The device R is similar to those known generally as "overrunning clutches" and has the usual cage and springs which control lock-up of the rollers 176 which elements are well understood in the art and need not be described in detail here. The runner hub 123 has cams 177 (Fig. 20) formed thereon of such shape that the runner can freely overrun the guide wheel forwardly but upon tendency of the guide wheel to overrun the runner in the forward direction, the rollers 176 will wedge between the cams 177 and the inner cylindrical surface of the hub portion 173 thereby providing a driving connection between the guide wheel and runner.

A second overrunning clutch S is operatively disposed between the crankshaft 55 and the shaft 128, this clutch device (Fig. 19) comprising rollers 179 and clutch members 178 and 180. Member 178 is press-fitted to the crankshaft 55 and has a cylindrical inner surface adapted to be engaged by the rollers 179 upon lock-up thereof under control of the cams 181 formed on member 180 which is splined on the shaft 128. The clutch S is of the forward lock type and prevents shaft 128 from overrunning the engine while permitting the crankshaft to overrun the shaft 128. This clutch functions to establish a direct connection between the shaft 128 and the crankshaft on coasting of the vehicle thereby making it possible to fully utilize the engine as a brake, the torque converter being inefficient as a torque transmitter in the opposite direction.

The hollow shaft 174 extends rearwardly in the casing 53 to the vicinity of the stationary member 147 where a sleeve 182 is splined thereon at 183. The sleeve 182 has a bearing race formed thereon which forms part of an anti-friction bearing 184, the other race being carried by the stationary member 147 as illustrated. Also formed on the sleeve 182 is a set of cams 185 which form part of an overrunning brake T. This brake is similar to the clutches R and S, but functions as a brake, the rollers 186 being adapted to wedge between the cams 185 and the inner cylindrical surface of the stationary member 147 to prevent reverse (counterclockwise) rotation of shaft 174 while freely permitting forward rotation thereof.

During operation of the engine the impeller wheel 72 is driven at the speed of the crankshaft or at a lower speed, depending upon the positions of the brake and clutch members controlling the forward planetary gearing, and the fluid thus set in motion will be discharged into the runner wheel 122 and thence into the guide wheel 171 from which it is returned to the impeller in the manner well known in the art.

The vanes of the three hydraulic wheels are so shaped that the hydraulic fluid discharged from the curved passages formed by the impeller vanes 187 (see Fig. 18) is received by the curved passages formed by the runner vanes 188 (Fig. 17) where the energy given up during passage through the runner passages is applied to the driving shaft 128. The vanes 189 of the guide wheel (Figs. 16 and 17) are curved in such manner that the direction of flow of the fluid is changed before it is delivered into the impeller passages, thus reaction for torque multiplication is supplied, the guide wheel being stationary during substantially all of the torque multiplication period.

The impeller vanes 187 are formed of single stampings, while the runner vanes 188 are formed of two stamped pieces of different curvature welded together at their end portions. The guide vanes 189 are also formed of single stamped pieces, but are folded and welded as shown in Figs. 16 and 17 to form streamlined vanes of correct curvature.

This vane construction eliminates die castings and provides a strong yet economical structure. Suitable torus ring portions 187', 188' and 189' are welded to the inner edges of the vanes as shown in Fig. 3 to strengthen the structure and guide the fluid flow. These torus ring portions are also preferably formed by stamping, thus it may be seen that substantially the entire converter is made of stampings with consequent economy and simplification of manufacture.

The main control valve V is a compound valve and is adapted for operation by manual and servo control under different vehicle operating conditions. The valve is supplied with pressure fluid by means of two pumps, designated P and Q, respectively (Fig. 4). These pumps may be of any known type such as gear, gerotor, etc. and are separately driven. The pump P is driven by a gear 200 which is keyed by balls 201 to the driving sleeve 59. It is thus apparent that pump P is driven directly by the engine and supplies pressure to the valve V at all times when the engine A is operating. Pump Q is driven by a gear 202 carried by the tail shaft 155 rearwardly of the rear transmission bearing 203. The pump Q is thus driven by the car whenever the rear wheels turn.

The pressure side of pump P is connected to the valve V by a conduit or pipe 205 and the pressure side of pump Q is connected thereto by a pipe 207. As can be more clearly seen in Fig. 5, the pipe 205 connects with a passage 208 which leads directly into chamber 210 of the valve and is connected by a branch passage 209 with chambers 204 and 206 thereof. The pipe 207 connects with a passage 211 which leads directly into chamber 206. Both pumps are supplied with fluid from the sump of the transmission casing through suitably located suction pipes 212, 213, respectively.

The valve V has a fourth chamber 214 which is connected with the chamber 204 by a pipe 215. A passage 216 connects the chamber 206 with the pipe 163 which leads to the rear clutch F. A vent passage 217 connects chamber 206 with vent pipe 218 which pipe is also connected with chamber 214 by passage 219 and with the rear ends of all of the chambers by a passage 220.

The respective valve chambers have stems disposed therein for sliding movement, suitable enlarged portions being provided on the stems for controlling the valving. The stems 221, 222 and 223 which are disposed respectively in chambers 204, 206 and 210 are all connected for conjoint movement and control by a cross-head 224 which cross-head is operably connected by a link 225 with a bellcrank 226 (Fig. 1). The latter is in turn operably connected by means of the links 227, 228 and 229 with a lever 230 carried by the lower end portion by a rod 231 bearinged on the steering column 233. At its upper end, closely adjacent the steering wheel 234, the rod 231 carries a lever 232 which is adapted for shifting by the driver.

The bellcrank 226 is pivoted on the side of the transmission casing 53 by means of a short shaft 235 (Fig. 14) which carries an arm 236 on its inner end. This arm is formed with an integral stud 237 which carries a roller 238. A shift yoke 239 for shifting the clutch sleeve 143 is carried by a shift rail 240 inside the casing (Figs. 14 and 15). The rail is suitably slidably mounted in bosses (not shown) formed in the casing and has an enlarged portion 241 formed with a right angled slot 242. The roller 238 is adapted to roll on the inner periphery of this slot as is apparent from Fig. 15.

The manually operable lever 232 is adapted to have four positions, i. e., "neutral," "forward," "reverse" and "park." These are indicated in Fig. 2 as N., F., R. and P., respectively, and corresponding positions of the cross-head 224, valving B and sleeve 143 are indicated by the same letters on Figs. 5, 7, 9, 11 and 15.

From these figures, it may be seen that when the lever 232 is in its Fig. 2 "neutral" position, the roller 238 is in the upper rear end of slot 242 (Fig. 15), the sleeve 143 is in "neutral" (Fig. 6) and the valve V is in such condition that fluid flowing from pump P (if the engine is running) is blocked from entering chamber 204, but enters chamber 206 through passage 209 from which it flows through passage 216 and pipe 163 into the pressure inlet passages 164, 165, 166, 167, 168 and 169 of cylinder 141. The clutch F is thus engaged and the planet carrier 136 is clutched to the annulus 152. No drive is transmitted from the engine to the rear wheels, however, because the fluid from pump P also enters valve chamber 210 whence it flows through pipe 105 into cylinder 102 releasing brake band 75. As passage 243, which connects chambers 214 and 210, is blocked off by stem 223, no pressure fluid flows into pipe 116 which leads to clutch E and this clutch is disengaged. Under these conditions, sun gear 73 of the forward planetary gearset is free to rotate and no drive is transmitted from the shell 54 to the impeller wheel.

The pump Q is vented by way of passage 211, chamber 206, passages 217, 220 and 218, therefore operation of pump Q (by coasting of the vehicle for example) will not effect the transmission under present conditions.

Shift of the hand lever 232 to "forward" position will shift the cross-head 224 to "forward" position through the intermediary of the links 229, etc., and the bellcrank 226. Movement of the cross-head to "forward" position (see Fig. 7) thrusts the valve stems 221, 222, 223 forwardly without effecting movement of the sleeve 143, the roller 238 (Fig. 15) moving forwardly to the forward portion of the horizontal slot. The valve V is now in such condition that pressure fluid from pump P flows through pipe 205 and passages 208, 209 into chamber 204, thence through pipe 215 into chamber 214. In chamber 214 is disposed a slidable stem 244. A solenoid 246 is operably connected therewith for shifting the stem in conjunction with a spring 245. In Fig. 7, the valve stem 244 is shown in underdrive or "kickdown" position, the solenoid 246 being energized and the spring 245 compressed. The pipe 116 is thus still blocked off from the pressure supply and clutch E is free. However, forward shift of valve stem 223 has cut off communication between passages 208 and 105, therefore pressure is "off" in cylinder 102 and brake band 75 is applied. This prevents rotation of the sun gear 73 of the forward planetary gearset and furnishes a reaction point for forward drive of the vehicle.

The engine thus drives the impeller wheel 72 at reduced speed ratio through the forward planetary gearing and shaft 128 transmits some driving torque to the tail shaft 155, the rear planetary control clutch F being engaged as there is pressure "on" in cylinder 141. This condition of the parts may be termed "traffic neutral" as the tail shaft 155 is not rotated. Because of the gear reduction through the forward planetary gearset, the impeller 72 is rotated at only .7 engine speed and as the driving effort is proportional to the speed of the impeller, there will not be sufficient torque available (at ordinary engine idling speed) to turn the runner 122. The latter will therefore remain stationary which condition is readily accommodated by the slipping characteristics of the hydraulic coupling.

Forward drive of the vehicle is initiated by establishing direct drive through the forward planetary gearing accompanied by simultaneous opening of the throttle. Referring for a moment to Fig. 1, it will be seen that an accelerator pedal 247 is provided for controlling the throttle valve 253. This pedal is connected to said valve through a linkage which comprises a thrust rod 248, a bellcrank 249 pivoted on the engine block at 250 and rods 251, 252. It is clear from the drawings that depression of the pedal 247 will open the valve 253 which will be closed by the return spring 254 upon release of the pedal.

The bellcrank 249 has a rod 255 attached thereto and this rod carries a pair of lugs 256, 257 for operating a switch lever 258 which is pivotally mounted at 259. The lever 258 forms part of a switch 260 which includes the fixed terminal 261.

A detent element 262 of spring metal is adapted to cooperate with a notched plate 263 for releasably retaining the movable lever 258 in open or closed position. The lugs 256, 257 are arranged such that the switch 260 is closed by movement of the throttle linkage to substantially wide-open throttle position and opened when the said linkage has been returned to idle position.

The bellcrank 249 also carries an adjustable screw 264 which is adapted to operate a switch 265. This switch has a pair of terminals 266, 267 which are bridged by a plate 268 when the plunger 269 is thrust downwardly. A spring 270 urges the plate 268 and plunger 269 upwardly to "open" position. The switch 265 is arranged with respect to the throttle linkage such that the switch is "closed" when the throttle is closed ("engine idle" position), but is opened immediately by the spring 270 upon depression of the accelerator pedal.

Both the switch 260 and the switch 265 control energization of the solenoid 246. The switch 260 acts in conjunction with a switch 271 which is controlled by engine vacuum. This switch has a pair of terminals 272, 273 normally bridged by a plate 274 which is urged to bridging position by a spring 276. A diaphragm 275 is also operably connected to the plate 274 as illustrated and this diaphragm is subjected to the influence of engine vacuum through a pipe 277.

When the switch 260 is closed, the solenoid 246 is energized from the vehicle battery 278 through wires 279, 280, 281, 282, 283 and 284 providing the switch 271 is closed. When the switch 265 is closed, the solenoid is energized through wires 284, 285 and 280.

With the cross-head 224 in Fig. 7 position, then the vehicle may be started by depressing the accelerator pedal 247 which will deenergize the solenoid 246 and permit the spring 245 to move the valve stem 244 to the dotted line position. Movement of stem 244 to this position will simultaneously engage clutch E (as illustrated in Fig. 8) and release brake band 75. The pressure fluid travels through pipes 215 and 116 to clutch E and through pipe 215, passage 243, chamber 210 and pipe 105 to brake cylinder 102. As soon as the tail shaft 155 turns, pump Q supplies pressure through line 207 and chamber 206 connects passage 207 with pipe 163 leading to rear clutch F. This operational cycle of the parts will be further explained in connection with the operation of the device.

Figs. 9 and 10 show the valve and sleeve parts set for reverse drive. The cross-head has been moved to reverse position by further clockwise movement of the manual lever 232 (Fig. 2) which action effects shift of rail 240 (Fig. 15) to mesh the sleeve teeth 144 with the teeth 146 of stationary member 147. The carrier 136 of the rear planetary gearset is thus locked against rotation and the valve V is in such condition that rear clutch control cylinder 141 is vented through pipe 163, valve chamber 206, passage 217 and passage 220. Upon depression of the accelerator pedal, shaft 155 will be rotated reversely relatively to shaft 128. It should be noted, however, that the forward planetary gearset will remain in underdrive during reverse driving of the vehicle because the main pressure line 205 is vented through passage 217 and thus there will be no pressure in chamber 214 to release brake band 75 and engage clutch E upon deenergization of solenoid 246. The drive in reverse is thus an extremely low ratio drive, the engine speed being reduced through the action of the converter and both planetary gearsets.

Figs. 11 and 12 illustrate the conditions prevailing in the control system when the lever 232 is set in "park" position which is reached by movement of the lever clockwise beyond "reverse" position. As is clear from Figs. 12 and 15, the rail 240 will be shifted to engage the sleeve teeth 145 with the teeth 151 of the annulus 152. The teeth 144 of the sleeve still bridge the teeth 142 and 146, thus it is clear that the annulus 152, the tail shaft 155 and the carrier 136 are all rigidly connected to the stationary member 147. The transmission is under these conditions locked up within itself and provision of a parking brake is rendered unnecessary. When the cross-head 224 is in "park" position, pump P is vented through passage 220 and pump Q is vented through passage 217.

As previously stated, switch 260 is closed when the accelerator pedal 247 is depressed to wide-open throttle position, therefore a shift down from direct drive to underdrive in the forward planetary gearset may be accomplished at the will of the driver. When the driver depresses the pedal 247 to extreme position, the solenoid 246 is energized and the valve stem 244 is thrust rearwardly to vent both clutch control cylinder 112 and brake control cylinder 102. The sun gear 73 and carrier 67 are thus released for relative rotation and the sun gear is braked against rotation by application of the band 75 through action of spring 103. The impeller 72 will then be driven at .7 engine speed (or some other desired speed relative to the engine) under wide-open throttle and increased acceleration will result. If desired, increased spring resistance may be provided for warning the driver at the point of kickdown so that unintended step-down may be avoided.

The switch 260 is so constructed that once closed, it is not opened until return of the pedal 247 to engine idle position. However, it is desirable in the operation of the transmission that a step-in in speed ratio after kickdown be had without the necessity of releasing the accelerator pedal and this is accomplished by the vacuum controlled switch 271. The spring 276 is of such force that suction acting through pipe 277 will keep the switch open until the throttle has been opened approximately one-third of full opening. After the accelerator pedal has been depressed to open the valve 253 more than one-third of full throttle, the vacuum in the manifold 50 falls to such a value that the spring 276 can close the switch. It is thus clear that when the switch 260 is closed at wide-open throttle to kickdown the driving ratio, the switch 271 is closed. The solenoid 246 is thus energized and the forward planetary gearset is caused to operate in underdrive. When the pedal 247 is released to approximately one-third throttle position, the vacuum in pipe 277 will then be sufficient to overcome the spring 276 and open the switch 271 whereupon the solenoid 246 will be deenergized and a return to direct drive will be immediately effected.

The pump Q which is driven by the tail shaft 155 through gear 286 makes it possible for the engine A to be started by pushing or towing the car. When the car is stopped with the engine dead, and the lever 232 in "forward" position, the valve V is in such condition (Fig. 7) that fluid can flow from either pump P or pump Q through chamber 206 and pipe 163 to the rear planetary control cylinder 141. As the engine is dead, pump P cannot furnish pressure, therefore, if pump P was the sole source of fluid pressure, it would not be possible to start the engine by towing because the clutch F could not be engaged. Rotation of the tail shaft 155 with the sleeve 143 in forward driving position and the clutch F disengaged imparts no drive to the shaft 128 because the planetary elements are free to rotate relatively.

With the pump Q connected as illustrated, pressure is built up rapidly in the cylinder 141 upon rotation of the tail shaft, and as soon as clutch F engages, the shaft 128 is rotated. Rotational tendency of shaft 128 forwardly at a speed in excess of the speed of the crankshaft 55 effects engagement of the overrunning roller clutch S (Figs. 3 and 19). The engine crankshaft is thus rotated directly by the shaft 128 and the engine can be started at a much lower car speed than would be the case if the drive had to be transmitted through the hydraulic unit, which because of its blading is inefficient when transmitting torque in a reverse direction.

The roller clutch S has another function, i. e., that of enabling the car to coast in direct drive directly against the engine, thus making engine braking available in a greater degree than would be possible if the hydraulic unit was in the driving train.

Figs. 16, 17 and 18 illustrate the vanes or blades of the hydraulic wheels 171, 122 and 72 in section. These vanes are of stamped construction. The vanes 187 of the impeller wheel are made of a single section stamping suitably shaped to give proper direction to the fluid. The vanes 188 of the runner are each made of two stampings suitably shaped and welded together. The guide wheel vanes 189 are each formed of a single stamped piece which is bent into streamline shape and welded at its trailing edge as shown.

The operation of the transmission is as follows. Let it be assumed that the vehicle is at rest with the engine running and the shift lever 232 in "neutral" position. Then the sleeve 143 will be in the position shown in Fig. 6 and the valve V will be in its Fig. 5 position. As the engine is operating, the pump P will deliver pressure through line 205 and the fluid flowing into the housing of the valve V will be blocked in chamber 204 thereof because of the position of the valve stem 221. The pressure fluid flowing into the chamber 206 through passage 209 flows through passage 216, line 163 and passages 164, 165, 166, 167, 168 and 169 into cylinder 141 which controls the rear planetary clutch F. The clutch F is therefore engaged and the annulus gear 152 is locked to the carrier 136. The fluid flowing into chamber 210 through passage 208 flows out of this chamber through line 105 into the brake control cylinder 102 where it overcomes the force of the spring 103 and releases brake band 75. Under such conditions, then, no drive will be transmitted from the engine A to the shaft 128 because neither clutch E nor brake band 75 are engaged. Therefore the planetary gear elements 64, 67 and 73 are free to rotate relatively. As the accelerator pedal 247 is in engine idle position, the switch 260 is open and the switch 265 is closed. The solenoid 246 is thus energized and the valve stem 244 is in its kickdown or no-creep position.

Shift of the manually operated lever 232 from "neutral" to "forward" position will move the cross-head 224 of the valve V to corresponding position illustrated in Fig. 7 without effecting any movement of the sleeve 143 as is accommodated by the roller and slot lost motion mechanism illustrated in Fig. 15. The pressure fluid from pump P now flows through passages 205, 208 and 209 into the chamber 204 thence through line 215 into chamber 214 where it is blocked by the enlarged portions of the valve stem 244 which still remains in no-creep position. Fluid also flows into chamber 206 of the valve, thence through passage 216 and line 163 to rear clutch control cylinder 141, thereby maintaining clutch F engaged. Valve stem 223 has moved forwardly to such position that communication between passages 208 and 105 is cut off. Therefore, brake band 75 is engaged with drum 74 and the forward planetary gearset is in driving condition. However, because of the speed reduction through the forward planetary gearset, the impeller wheel 72 is driven at approximately .7 engine speed and the torque exerted by the impeller wheel is insufficient to overcome the static friction incidental to starting the vehicle in motion. Thus, the transmission is set for forward driving but no movement of the vehicle has taken place as yet.

Forward movement of the vehicle may now be initiated by depressing the accelerator pedal 247 which increases engine speed through opening of the throttle valve 253 while at the same time opening of the switch 265 is effected by means of the spring 270. Immediately upon opening of the switch 265, spring 245 acts to shift the valve stem 244 to its direct drive position shown by the dotted lines on Fig. 7. The pressure fluid from pump P flowing in line 215 then flows by way of valve passage 215 into lines 116 and 243. The fluid flowing through line 116 flows through the casing passages 117 and 118, 119 and 120 and 121 into the forward clutch control cylinder 112 thereby moving the piston 114 and engaging clutch E. Simultaneously, the fluid flowing through passage 243 flows into chamber 210 thence through passage 105 and 104 into cylinder 102 where it effects movement of the pistons 101 and releases the brake band 75.

The vehicle is now in direct drive so far as the gearing of the transmission is concerned but the engine is rotating faster than the tail shaft 155 because of the slip between the runner or turbine wheel 122 and the impeller 72 of the hydraulic unit. Because of the shape of the vanes 187, 188 and 189 of the hydraulic wheels, the guide wheel 171 will under presently described conditions have a tendency to rotate reversely because of the reaction of the fluid impinging thereon, which fluid is being discharged from the vane formed passages of the runner 122 into the passages of the guide wheel 171. However, because the overrunning roller clutch T prevents reverse rotation of the hollow shaft 174 which carries the guide wheel 171, the guide wheel will be stationary, thus furnishing reaction for torque multiplication in the hydraulic unit.

As the speed of the shaft 128 increases (shafts 128 and 155 rotate at the same speed because annulus gear 152 and carrier 136 are clutched together by clutch F), the slip between the runner 122 and the impeller 72 will decrease and as these two hydraulic wheels approach synchronous speed, the reaction on guide wheel 171 will become progressively less until it reaches a value of zero whereupon further decrease in slip between runner 122 and impeller 72 will result in a forward rotational component on the vanes of guide wheel 171 and this wheel will then begin to rotate forwardly as permitted by the one-way characteristic of clutch T. The guide wheel 171 will then rotate forwardly with increasing speed until it comes up to the speed of the runner 122 whereupon overrunning roller clutch R will function to lock the wheels 171 and 122 together. The hydraulic unit is now functioning as a fluid coupling of the kinetic type, the wheel 72 being driven at engine speed and functioning as an impeller or pump wheel and the wheels 122 and 171 acting together as a runner or turbine wheel, the speed relationship between the impeller 72 and the composite runner 122, 171 being that of an ordinary fluid coupling. Under normal driving conditions, the runner will lag the impeller by about 3%.

It is desirable that the elements of the hydraulic unit be so constructed that engagement of roller clutch R will occur just prior to the torque multiplication through the hydraulic unit becoming zero and it is desirable for the unit to reach this condition at a vehicle speed of approximately 20 M. P. H. at which speed the accelerating characteristics will be satisfactory at 1 to 1 speed ratio. The speed at which the transmission will reach 1 to 1 speed ratio will, of course, vary somewhat depending upon the throttle opening and should it be desired to extend the range of torque conversion to a higher speed of vehicle operation, this can be done by proper design of the hydraulic wheels.

Release of the accelerator pedal 247 preparatory to bringing the vehicle to a stop will result in the throttle valve 253 being closed (except for the opening communication provided for maintaining engine idle) and closure of switch 265. Closure of switch 265 will cause solenoid 246 to be energized and valve stem 244 will be moved to its kickdown or no-creep position against the force of the spring 245. If the vehicle is coasting, however, this movement of the valve stem 244, which effects disengagement of clutch E and engagement of brake band 75 with brake drum 74, thereby shifting the forward planetary gearset into underdrive will not effect the drive since the shaft 128 will tend to overrun the engine shaft 55 and, will engage overrunning clutch S and the vehicle will coast against engine compression.

When the vehicle comes to a stop (as by coasting or by coasting accompanied by application of the main vehicle brakes, not shown), the forward planetary gearset will be in underdrive and the vehicle will remain stationary without creeping until the driver wishes to resume forward drive whereupon depression of the accelerator pedal 247 will institute the above described cycle of operation.

In the interest of economy and efficiency, it is desirable that the presently described transmission be used with a rear axle ratio in the order of 3.3 to 1 or 3 to 1. With such a "high speed" axle, the accelerating characteristics of the vehicle may, under certain driving conditions, be insufficient and if the driver wishes more acceleration than is normally available by increased opening of the throttle valve, he may push the accelerator pedal 247 downwardly to wide open throttle position whereupon the lug 256 will engage the switch lever 258 of the switch 260 and move the latter to closed position. Closing of the switch 260 will effect energization of the solenoid 246 whereupon the stem 244 of valve V will be thrust rearwardly against spring 245 to kickdown position and both clutch control cylinder 112 and brake control cylinder 102 will be vented through chamber 214 and passage 218, the fluid pressure flowing to these cylinders through line 215 being cut off by the enlarged portions of the stem 244. Clutch E will therefore be released and brake band 75 will be applied to the brake drum 74 thereby holding sun gear 73 against rotation and causing the impeller 72 to be driven at an under speed with respect to the engine crankshaft 55 through annulus gear 64 and planet pinion 66 with consequent torque multiplication.

This is the "kickdown" condition of the transmission and the parts will remain in their kickdown positions until the accelerator pedal 247 is released to substantially one-third of full throttle opening movement whereupon the suction in the intake manifold 50 acting on the diaphragm 275 of the switch 271 through line 277 will reach a sufficient value such that it will overcome the pressure of spring 276 and disestablish electrical communication between the contacts 272, 273 whereupon the solenoid 246 will be de-energized and the forward planetary gearset will be shifted to direct drive by release of brake band 75 and engagement of clutch E.

Switch lever 258 of the switch 260 will be retained in closed position by the action of the detent 262 until the accelerator pedal is released to substantially throttle closed position whereupon the lug 257 will open the switch. It is to be noted that the plunger plate 274 of switch 271 will bridge but not touch the contacts 272, 273 at engine idle position and under other operating conditions except when the throttle valve 253 is opened in excess of one-third of its full throttle opening. The operation of switch 271 has no effect on the operation of the transmission during normal driving because switch 260 is normally open and is not closed except when the throttle linkage is moved to wide open throttle position.

Shift of the manually operable lever 232 to "reverse" position moves the valve operating cross-head 224 to Fig. 9 position and simultaneously shifts the clutch sleeve 143 to Fig. 10 position whereupon the carrier 136 of the rear planetary gearset is clutched to the stationary member 147, the teeth 144 bridging the teeth 142 and the teeth 146. When the transmission is set for reverse driving, both the pump P and pump Q are vented. Pump P is vented through pipe 205, passage 208, 209, chamber 206 and passage 217. Pump Q is vented through passage 207, chamber 206 and the passage 217. Thus, it is clear that clutches E and F are disengaged but brake band 75 is applied to drum 74 because of the action of the springs 103. Depression of the accelerator pedal to cause the vehicle to be driven in a reverse direction will, of course, be accompanied by opening of the switch 265 which has no effect under these conditions because both pumps are vented. The driving torque will therefore be transmitted from crankshaft 55 through the hydraulic unit which furnishes full torque multiplication to the shaft 128 which rotates sun gear 135 forwardly. Carrier 136 is, however, clutched by means of the sleeve 143 to the stationary member 147. Thus, the annulus gear 152 will be driven reversely and the reverse drive will be transmitted to the rear wheels by way of tail shaft 155 and the vehicle propeller shaft (not shown).

When it is desired to park the vehicle, the shift lever 232 is moved to "park" position, which action thrusts the cross-head 224 forwardly to Fig. 11 position and sleeve 143 forwardly to Fig. 12 position. The annulus gear 152 and the carrier 136 are now both clutched to the stationary member 147. Thus the tail shaft 155 is locked against movement and the vehicle cannot be moved.

Both pump P and pump Q are vented when the lever 232 is in "park" position, pump P being vented through passages 208, 209 and chamber 204 and pump Q being vented through passage 207, chamber 206 and passage 217.

It will thus be seen that I have provided a novel and improved transmission which is entirely automatic in operation and wherein the use of a clutch pedal is eliminated. The change in driving direction is controlled entirely by operation of the hand lever and the change in speed ratio is controlled entirely by the accelerator pedal. Inasmuch as during normal operation of the car the necessary changes in speed ratio are effected entirely by dynamic action of fluid in the hydraulic torque converter, the use of the kickdown gear being infrequent under ordinary conditions, there will be practically no wear of the gears of the planetary gearsets or of the clutches E and F or the band lining 76.

It will be noted that engagement and disengagement of the reduction gear for no-creep takes place under practically no load. Thus, automatic traffic neutral is provided with absence of creeping tendency and without wear on the parts.

In my novel and improved transmission, changes in driving ratio take place automatically in infinitely small steps under normal driving conditions and these driving ratio changes are responsive to torque requirements at the drive wheels of the vehicle without the use of governor mechanisms, troublesome particularly in cold climates.

Having thus described the preferred embodiment of my improved transmission for the purposes of illustration, I wish to point out that changes in the form and arrangement of the parts, etc., may be made by those skilled in the art without departing from the spirit of the invention and the scope of the claims appended hereto.

I claim:

1. In a power transmission for a vehicle having an engine and a driven shaft, a hydraulic torque converter including an impeller wheel, a runner wheel and a guide wheel drivingly disposed between the engine and the driven shaft; change speed gearing drivingly disposed between the engine and driven shaft and arranged and constructed to provide either a direct drive or an underdrive connection between the engine and the impeller of the torque converter; means for conditioning said change speed gearing in direct drive to drive the impeller at the speed of the engine or in underdrive to drive the impeller at a reduced speed relatively to the engine; and manually operated means for controlling said last means arranged to establish said change speed gearing in underdrive at relatively low engine speeds.

2. In a power transmission for a vehicle having an engine and a driven shaft, a hydraulic torque converter including an impeller wheel, a runner wheel and a guide wheel drivingly disposed between the engine and the driven shaft; a reduction gear drivingly disposed between the engine and the torque converter; means for conditioning said reduction gear to drive the impeller at the speed of the engine or at a reduced speed relatively to the engine; a throttle control for the engine; and means operably connecting said throttle control with said reduction gear conditioning means whereby said reduction gear may be selectively conditioned to drive the impeller at one or another of said speeds in response to predetermined operation of the throttle control between open and closed throttle.

3. In a power transmission for a vehicle having an engine; a driven shaft operably connected to the vehicle driving wheels, a hydraulic torque converter including an impeller wheel, a runner wheel and a guide wheel drivingly disposed between the engine and the driven shaft; a reduction gear drivingly disposed between the engine and the torque converter; means for conditioning said reduction gear to drive the impeller at the speed of the engine or at a reduced speed relatively to the engine; a throttle control for the engine movable by the driver between idle and wide-open throttle positions; and means operably connecting said throttle control with said reduction gear conditioning means for establishing said impeller in said reduced speed drive relative to said engine when said throttle control is established in engine idle position and for establishing drive of the impeller at the speed of the engine in response to movement of said throttle control out of idle position in the direction of wide open throttle.

4. In a power transmission for a vehicle having an engine; a driven shaft operably connected to the vehicle driving wheel, a hydraulic torque converter including an impeller wheel, a runner wheel and a guide wheel drivingly disposed between the engine and the driven shaft; a reduction gear drivingly disposed between the engine and the torque converter; means for conditioning said reduction gear to drive the impeller at the speed of the engine or at a reduced speed relatively to the engine; a throttle control for the engine movable by the driver between idle and wide-open throttle positions; and means operably connecting said throttle control with said reduction gear conditioning means for establishing said impeller in said reduced speed drive relative to said engine when said throttle control is established in engine idle position and in wide-open position, and for establishing drive of the impeller at the speed of the engine when said throttle control is intermediate these positions.

5. In a power transmission for a vehicle having an engine provided with a throttle and throttle control and a driven shaft operably connected to the vehicle driving wheels, a planetary annulus gear driven by the engine; a sun gear; a carrier; planet pinions mounted on the carrier and disposed in mesh with the annulus and sun gears; a hydraulic impeller driven by said carrier; a hydraulic runner drivingly connected to the driven shaft; a brake for preventing rotation of the sun gear whereby to establish a reduced speed drive between the engine and said impeller; a clutch for clutching the sun gear to one of the other planetary members whereby to establish a direct drive between the annulus gear and said impeller; and means for controlling said clutch and brake including means associated with said throttle control for actuating said control means to apply said brake incident to conditioning said transmission for operable forward drive of the vehicle driving wheels by the engine from rest and to release said brake and engage said clutch at a throttle control position less than wide open throttle.

6. In a power transmission for a vehicle having an engine provided with a throttle and throttle control and a driven shaft operably connected to the vehicle driving wheels, a planetary annulus gear driven by the engine; a sun gear; a carrier; planet pinions mounted on the carrier and disposed in mesh with the annulus and sun gears; a hydraulic impeller driven by said carrier; a hydraulic runner drivingly connected to the driven shaft; a brake for preventing rotation of the sun gear whereby to establish a reduced speed drive between the engine and said impeller; a clutch for clutching the sun gear to one of the other planetary members whereby to establish a direct drive between the annulus gear and said impeller; and control means for controlling said clutch and brake including means associated with said throttle control for actuating said control means to apply said brake incident to conditioning said transmission for operable forward drive of the vehicle driving wheels by the engine from rest and to release said brake and engage said clutch at a throttle control position less than wide open throttle, said control means being constructed and arranged such that operation of said control means to apply said brake will cause disengagement of said clutch and vice-versa.

7. In a power transmission for a vehicle having an engine provided with a throttle and throttle control and a driven shaft; a planetary annulus gear driven by the engine; a sun gear; a carrier; planet pinions mounted on the carrier and disposed in mesh with the annulus and sun gears; a hydraulic impeller driven by said carrier; a hydraulic runner drivingly connected to the driven shaft; a brake for preventing rotation of the sun gear; a clutch for clutching the sun gear to one of the other planetary members; hydraulically operated means for engaging said clutch against spring pressure; hydraulically operated means for disengaging said brake against spring pressure; control means for said hydraulic means and means operably interconnecting said control means and said throttle control for actuating said hydraulic operated means to apply said brake and release said clutch upon positioning of said throttle control to engine idle position.

8. In a power transmission for a vehicle havig an engine provided with a throttle and throttle control and a driven shaft, a planetary annulus gear driven by the engine; a sun gear; a carrier; planet pinions mounted on the carrier and disposed in mesh with the annulus and sun gears; a hydraulic impeller driven by said carrier; a hydraulic runner drivingly connected to the driven shaft; a brake for preventing rotation of the sun gear; a clutch for clutching the sun gear to one of the other planetary members; hydraulically operated means for engaging said clutch against spring pressure; hydraulically operated means for disengaging said brake against spring pressure; control means for said hydraulic means including a valve adapted to supply pressure fluid to said clutch and brake control means simultaneously and means operably interconnecting said control means and said throttle control for actuating said hydraulic operated means to apply said brake and release said clutch upon positioning of said throttle control to engine idle and wide open throttle positions.

9. In a power transmission for a vehicle having an engine provided with a throttle and throttle control and a driven shaft, a planetary annulus gear driven by the engine; a sun gear; a carrier; planet pinions mounted on the carrier and disposed in mesh with the annulus and sun gears; a hydraulic impeller driven by said carrier; a hydraulic runner drivingly connected to the driven shaft; a brake for preventing rotation of the sun gear; a clutch for clutching the sun gear to one of the other planetary members; means for controlling said clutch and brake; and means operably connecting said last means with the throttle control whereby said clutch and brake are adapted to be operated in response to predetermined operation of the throttle control to engine idle position, to wide open throttle position and to a position intermediate said first two mentioned positions.

10. In a power transmission for a vehicle having an engine provided with a throttle and throttle control and a driven shaft, a planetary annulus gear driven by the engine; a sun gear; a carrier; planet pinions mounted on the carrier and disposed in mesh with the annulus and sun gears; a hydraulic impeller driven by said carrier; a hydraulic runner drivingly connected to the driven shaft; a brake for preventing rotation of the sun gear; a clutch for clutching the sun gear to one of the other planetary members; pressure fluid actuated means for controlling said clutch and brake; a source of pressure fluid; a control valve; a solenoid for operating said valve; and vacuum operated switch means operable in response to predetermined operation of said throttle control for controlling said solenoid.

11. In a power transmission for a motor vehicle, a driving shaft; a driven shaft; means for connecting said shafts including a fluid power transmitting device; reduction gearing drivingly disposed between said driving shaft and said fluid device; fluid pressure operated means for controlling said reduction gearing operable to establish a 1 to 1 speed ratio or a reduced speed ratio through said gearing; a source of fluid pressure; valve means associated therewith; said valve means including an electrically operated valve for effecting speed ratio change in said gearing; a manually operated valve for controlling admission of fluid to said electrically operated valve and a plurality of switches for independently controlling electrical operation of said electrically operated valve.

12. The combination set forth in claim 11 wherein said vehicle is provided with a manually operated throttle control and said electrically operated valve switches are arranged to be selectively operated in response to predetermined operation of said throttle control.

13. In a power transmission for a motor vehicle, a driving shaft; a driven shaft; means for connecting said shafts including a fluid power transmitting device; reduction gearing drivingly disposed between said driving shaft and said fluid device; fluid pressure operated means for controlling said reduction gearing operable to establish a 1 to 1 speed ratio or a reduced speed ratio through said gearing; a source of fluid pressure; valve means associated therewith; said valve means including an electrically operated valve for effecting speed ratio change in said gearing and a manually operated valve for controlling admission of fluid to said electrically operated valve; and a manually operated throttle control operably connected with said electrically operated valve, adapted to actuate said valve to effect a shift of speed ratio when movement of said throttle control is initiated.

14. In a power transmission for a motor vehicle, a driving shaft; a driven shaft; a planetary gearset having an input member driven by said driving shaft; a fluid power transmitter having an input member driven by the output member of said gearset; a second planetary gearset having an input member driven by the output member of said transmitter; fluid pressure operated means for controlling said gearsets including a pump driven from said driving shaft and a pump driven from said driven shaft; and valve means associated therewith for controlling the output of said pumps, said valve means being so constructed and arranged such that fluid pressure may be delivered to both said gearsets by the driven shaft pump when the transmission is conditioned for forward drive.

15. In a power transmission for a motor vehicle, a driving shaft; a driven shaft; a planetary gearset having an input member driven by said driving shaft; a fluid power transmitter having an input member driven by the output member of said gearset; a brake associated with the third member of said gearset operable to prevent rotation thereof; a clutch associated with said third gearset member and one of the other gearset members operable to lock said gearset members for rotation as a unit; spring means for engaging said brake; spring means for disengaging said clutch; and fluid pressure operated means normally arranged to establish said clutch in disengaged position and said brake engaged when the vehicle is at rest with the transmission conditioned for forward drive and adapted for operation to simultaneously engage said clutch and disengage said brake in accelerating the vehicle from rest.

16. In a power transmission for a motor vehicle, a driving shaft; a driven shaft; a planetary gearset having an input member driven by said driving shaft; a fluid power transmitter having an input member driven by the output member of said gearset; a brake associated with the third member of said gearset operable to prevent rotation thereof; a clutch associated with said third gearset member and one of the other gearset members operable to lock said gearset members for rotation as a unit; spring means for engaging said brake; spring means for disengaging said clutch; a source of fluid pressure; means for applying said fluid pressure to said clutch and brake for controlling the same; a throttle control for said vehicle; and valve means associated with said throttle control and said fluid pressure means whereby said brake and clutch may be controlled to normally establish said clutch in disengaged position and said brake engaged when the throttle control is in engine idle position and operable in response to movement of said throttle control from engine idle position to engage said clutch and release said brake.

17. In a motor vehicle having an engine provided with a throttle and a throttle control, a power transmission for driving said vehicle from said engine including a fluid power transmitter and a gear means; power operated means for changing the speed ratio of said gear means from 1 to 1 ratio to a ratio different from 1 to 1 and back to 1 to 1; means operably associated with said throttle control for controlling said power operated means, said last means being constructed and arranged such that said gear means is maintained in its lower ratio when said throttle control is in engine idle position and is responsive to movement of the throttle control from engine idle position to change the speed ratio to 1 to 1.

18. In a motor vehicle having an engine provided with a throttle and a throttle control, a power transmission for driving said vehicle from said engine including a fluid power transmitter and a gear means; power operated means for changing the speed ratio of said gear means from 1 to 1 ratio to a ratio different from 1 to 1 and back to 1 to 1; means operably associated with said throttle control for controlling said power operated means, said last means being constructed and arranged such that said gear means is maintained in its lower ratio when said throttle control is in engine idle and wide-open position.

19. In a motor vehicle having an engine provided with a throttle and a throttle control, a power transmission for driving said vehicle from said engine including a fluid power transmitter; a gear means disposed between the engine and the fluid transmitter for driving the input member of said transmitter at the speed of the engine or at a relatively lower speed; power operated means for controlling said gear means; means associated with said throttle control for controlling said power means whereby said gear means is caused to be actuated to its lower speed ratio when said throttle control is moved to engine idle position and to wide open throttle position.

20. In a power transmission for a vehicle having an engine, a driving shaft driven by the engine; a driven shaft; a planetary gearset drivingly disposed between said shafts having an input annulus gear, an output carrier and a sun gear; an annular reciprocable fluid piston carried by said annulus gear concentric therewith; a clutch member carried by said annulus gear for actuation by said piston; a clutch member carried by said sun gear for clutching engagement with said annulus gear clutch member; a brake drum carried by said sun gear; a stationary brake band adapted for operation to engage said drum; fluid pressure means for operating said piston and said brake band; and control means for controlling said fluid pressure means and for preventing simultaneous operation of said brake and clutch members.

21. In a power transmission for driving a motor vehicle having an engine provided with a throttle valve and a driver operable control for adjusting said valve between its open and closed positions, driving and driven shafts; a change speed mechanism drivingly disposed between said shafts for providing a slow and a fast drive therebetween; control means for said change speed mechanism; means operably connecting said throttle control and said control means arranged such that said change speed mechanism is stepped-down from fast to slow drive in response to manipulation of said throttle control to substantially wide-open position; means for releasably holding said connecting means in its downshift effecting arrangement; and means connected to said change speed control independently of said throttle control operable in response to variations in engine load for restoring said fast drive.

22. In a power transmission for driving a motor vehicle having an engine provided with a throttle valve and a driver operable control for adjusting said valve between its open and closed positions, driving and driven shafts; a shiftable gear mechanism drivingly disposed between said shafts for providing a slow and a fast drive therebetween; control means for said gear mechanism; means operably connecting said throttle control and said control means arranged such that said gear mechanism is shifted from fast to slow drive in response to manipulation of said throttle control to either its closed position or its open position.

23. In a power transmission for driving a motor vehicle having an engine provided with a throttle valve and a driver operable control for adjusting said valve between its open and closed positions, driving and driven shafts; a shiftable gear mechanism drivingly disposed between said shafts for providing a slow and a fast drive therebetween; control means for said gear mechanism; means operably connecting said throttle control and said control means arranged such that said gear mechanism is shifted from fast to slow drive in response to manipulation of said throttle control to substantially wide-open position including a switch; and a second switch connected to said gear control means but having no operable connection with said throttle control, operable in response to variations in engine load for restoring said fast drive.

24. In a power transmission for driving a motor vehicle having an engine provided with an intake manifold, a throttle valve and a driver operable control for adjusting said valve between its open and closed positions, driving and driven shafts; a shiftable gear mechanism drivingly disposed between said shafts for providing a slow and a fast drive therebetween; a servo-motor for controlling said gear mechanism; electrical means for controlling said servo-motor; a switch adapted to be closed in response to movement of said throttle control to substantially wide open position for effecting down-shift in said gear mechanism; means for releasably retaining said switch closed and a second switch adapted for operation by suction of said manifold for effecting up-shift in said gear mechanism even though said first switch may be closed.

25. In a power transmission for driving a motor vehicle having an engine provided with an intake manifold, a throttle valve and a driver operable control for adjusting said valve between its open and closed positions, driving and driven shafts; a shiftable gear mechanism drivingly disposed between said shafts for providing a slow and a fast drive therebetween; a servo-motor for controlling said gear mechanism; electrical means for controlling said servo-motor; a switch adapted to be closed in response to movement of said throttle control to substantially wide open position for effecting down-shift in said gear mechanism; and a second switch adapted for operation by suction of said manifold for effecting up-shift in said gear mechanism only after said throttle control has been moved approximately one third of its travel toward closed position and although said first-mentioned switch may then be closed.

26. In a power transmission for driving a motor vehicle having an engine provided with an intake manifold, a throttle valve and a driver operable control for adjusting said valve between its open and closed positions, driving and driven shafts; a shiftable gear mechanism drivingly disposed between said shafts for providing a slow and a fast drive therebetween; a servo-motor for controlling said gear mechanism; electrical means for controlling said servo-motor; a switch adapted to be closed in response to movement of said throttle control to substantially wide open position for effecting down-shift in said gear mechanism; and a second switch adapted for operation by suction of said manifold for effecting up-shift in said gear mechanism after said throttle control has been moved approximately one third of its travel toward closed position; and a third switch operable to effect down-shift in said gear mechanism in response to movement of said throttle control to closed position.

27. In a power transmission for driving a motor vehicle having an engine provided with an intake manifold, a throttle valve and a driver operable control for adjusting said valve between its open and closed positions, driving and driven shafts; a shiftable gear mechanism drivingly disposed between said shafts for providing a slow and a fast drive therebetween; a servo-motor for controlling said gear mechanism; electromagnetic means for controlling said servo-motor adapted when energized to effect step-down operation of said servo-motor; a switch for connecting said electromagnetic means with a current source; means operably connecting said switch with said throttle control whereby said switch is closed at wide-open throttle and opened at closed throttle; a second switch connected in series with said first switch for interrupting the current supply to said electromagnetic means in response to predetermined vehicle operating conditions when said throttle control is intermediate its open and closed positions and means for releasably holding said first-mentioned switch closed during manipulation of said throttle control between its said wide open throttle position and its said intermediate position.

28. In a power transmission for a motor vehicle, a member adapted for manual shifting; a second member operable independently of said first member adapted for shifting by fluid pressure; a driver operable control lever for positively shifting said members; a valve for controlling shift of said second member; linkage operably connecting said valve with said lever; a shift yoke for effecting shift of said first member; and a lost motion connection between said yoke and said lever operable to permit limited movement of said lever for controlling said valve without causing movement of said yoke.

29. In a power transmission for a motor vehicle, a member adapted for manual shifting; a second member adapted for shifting by fluid pressure; a driver operable control lever; a valve for controlling shift of said second member; linkage operably connecting said valve with said lever; a shift yoke for effecting shift of said first member; an angular slot in said yoke; a pin carried by said linkage and engaging said slot; said slot and pin being arranged such that shift of said lever will effect movement of said valve alone during part of the operating stroke of said lever and will effect movement of both valve and yoke during the remainder of said stroke.

30. In a power transmission for a vehicle having an engine, a driving shaft driven by the engine; a driven shaft; gear means operably associated with said shafts including a member shiftable by fluid pressure to operably connect certain of said gear means for establishing a drive between said shafts/ a pump driven by the engine; a second pump driven by the driven shaft; and driver operable valve means for controlling the output of both said pumps constructed and arranged such that said shiftable drive establishing member may be actuated by either of said pumps.

31. In a motor vehicle power transmission, a drive shaft; a driven shaft; a planetary gearset for establishing a drive between said shafts including an input annulus gear, an output carrier and a sun gear; a brake drum carried by the sun gear; a brake band adapted to engage said drum; a clutch element carried by the sun gear; a second clutch element carried by the annulus gear; and fluid pressure means for controlling said clutch element and brake band including a fluid motor carried by the annulus for rotation therewith and a pump driven by said annulus gear for supplying pressure fluid to said pressure fluid means.

32. In a motor vehicle power transmission, a drive shaft; a driven shaft; a planetary gearset for establishing a drive between said shafts including an input annulus gear, an output carrier and a sun gear; a brake drum carried by the sun gear; a brake band adapted to engage said drum; a clutch element carried by the sun gear; a second clutch element carried by the annulus gear; fluid pressure motors for engaging said clutch elements and for disengaging said brake band against spring pressure; a pump driven by said annulus gear for supplying pressure fluid to said motors, and selectively operable means for controlling said motors.

33. In a power transmission for a motor vehicle, a driving shaft; a driven shaft; means for connecting said shafts including a fluid power transmitting device; reduction gearing drivingly disposed between said driving shaft and said fluid device; fluid pressure operated means for controlling said reduction gearing operable to establish a 1 to 1 speed ratio or a reduced speed ratio through said gearing; a source of fluid pressure; valve means associated therewith; said valve means including an electrically operated valve for effecting speed ratio change in said gearing, a manually operated valve for controlling admission of fluid to said electrically operated valve, and switch means including a vacuum operated switch for controlling electrical operation of said electrically operated valve.

34. In a power transmission for a motor vehicle, a driving shaft; a driven shaft; a planetary gearset having an input member driven by said driving shaft; a fluid power transmitter having an input member driven by the output member of said gearset; a second planetary gearset having an input member driven by the output member of said transmitter; fluid pressure operated means for controlling said gearsets including a pump driven by said driving shaft and a pump driven from said driven shaft; and valve means associated therewith for controlling the output of said pumps, said valve means being so constructed and arranged such that fluid pressure may be transmitted to the second gear set by the driven shaft pump for conditioning the transmission to permit engine starting by towing of the vehicle.

35. In a power transmission for a vehicle having an engine, a driving shaft driven by the engine, a driven shaft for driving the vehicle driving wheels, a fluid power converter of a type operable as a torque converter in starting the vehicle from rest to provide a torque multiplying drive between said shafts and operable to provide a slip coupling drive at predetermined vehicle speeds, change speed mechanism operably positioned to transmit drive from the driving shaft to the power converter, a driver operated throttle control element, means for conditioning said change speed mechanism to drive the power converter at a reduced speed drive relatively to said driving shaft and at a speed drive which is relatively higher than said reduced speed drive and control means for said conditioning means operable automatically to establish said change speed mechanism in said reduced speed drive at engine idle position of said throttle control element to thereby establish drive of said power converter at such reduced speed relative to said engine while maintaining the engine and driving wheels operably connected such that the torque delivered by the power converter to the driven shaft is insufficient to move the vehicle.

36. In a power transmission for a vehicle having an engine and a driven shaft, a hydraulic torque converter including an impeller wheel, a runner wheel and a guide wheel drivingly disposed between the engine and the driven shaft; a reduction gear drivingly disposed between the engine and torque converter; means for conditioning said reduction gear to drive the impeller at the speed of the engine or at a reduced speed relatively to the engine; a throttle control for the engine; and means operably connecting said throttle control with said reduction gear conditioning means for automatically conditioning said reduction gear to drive the impeller at reduced speed relative to the engine during all forward speed ratio drives of the vehicle when the throttle control is in idle position and for automatically conditioning said reduction gear to drive the impeller at the speed of the engine in response to movement of the throttle control in the direction of wide open throttle position.

37. In a power transmission for a vehicle having an engine and a driven shaft, a hydraulic torque converter including an impeller wheel, a runner wheel and a guide wheel drivingly disposed between the engine and the driven shaft; a reduction gear drivingly disposed between the engine and the torque converter; means for conditioning said reduction gear to drive the impeller at the speed of the engine or at a reduced speed relatively to the engine; a throttle control for the engine; and means operably connecting said throttle control with said reduction gear conditioning means for automatically conditioning said reduction gear to drive the impeller at reduced speed relative to the engine upon positioning of the throttle control in engine idle position with the engine operably connected to the vehicle driving wheels, and for automatically conditioning said reduction gear to drive the impeller at the speed of the engine in response to movement of the throttle control in the direction of wide open throttle position.

38. A power transmission for a vehicle having an engine and a driven shaft comprising, a hydraulic torque transmitting device having an impeller wheel, a runner wheel for connecting with the driven shaft, and a guide wheel; change speed gearing having an input member for drivingly connecting with the engine and an output member drivingly connected to said impeller; said gearing being arranged and constructed to provide a direct drive and an underdrive connection between the engine and said impeller, means for selectively conditioning said gearing in direct drive to drive the impeller at the speed of the engine or in underdrive to drive the impeller at a reduced speed relatively to the engine, and means for automatically controlling said conditioning means to establish said change speed gearing in underdrive at relatively low speeds of the engine during all forward drive of the vehicle.

39. In a power transmission for a vehicle having an engine and a driven shaft, a hydraulic torque transmitting device including an impeller wheel, a runner wheel, a guide wheel and a rotatable enclosing shell for said wheels drivingly connected to the engine; planetary gearing including an annulus drivingly connected to said shell, a carrier drivingly connected to said impeller and a sun gear; means for holding the sun gear for driving the impeller at a reduced speed relatively to the engine; means for coupling said sun gear and one of the other planetary elements for driving the impeller at substantially the speed of the engine; and means under driver control for controlling said holding and coupling means.

40. In a power transmission for a vehicle having an engine and a driven shaft, a hydraulic torque transmitting device including an impeller wheel, a runner wheel, a guide wheel and a rotatable enclosing shell for said wheels drivingly connected to said engine; a planetary unit including an annulus drivingly connected to said shell; a carrier drivingly connected to said impeller and a sun gear, said torque transmitting device being physically disposed between the engine and said planetary unit; means for holding the sun gear for driving the impeller at a reduced speed relative to the engine; means for coupling said sun gear and one of the other planetary elements for driving the impeller at substantially the speed of the engine; and means under driver control for controlling said holding and coupling means.

41. In a power transmission for a motor vehicle having an engine provided with a throttle valve and a driver operable control for adjusting said throttle valve between open and closed position, a drive shaft, a driven shaft, change speed mechanism drivingly connecting said shafts for providing a slow speed ratio drive and a fast speed ratio drive therebetween, means for controlling changes from slow to fast speed ratio drive in said mechanism and vice versa, means controlling said change speed control means and operable in response to manipulation of said valve control to predetermined position in throttle opening direction for obtaining a speed ratio change in said change speed mechanism from a condition of fast speed ratio drive to said slow speed ratio drive and adapted to facilitate re-establishment of said fast speed ratio drive upon subsequent manipulation of said valve control to predetermined position in throttle closing direction, means for releasably holding said control means for said change speed control means in its operative position corresponding to said predetermined position of the throttle valve control in throttle opening direction during manipulation of the latter between both its said predetermined positions and means responsive to variations in engine load operable to obtain re-establishment of said fast speed ratio drive at a position of said valve control between said predetermined positions aforesaid of said throttle valve control.

42. In a motor vehicle having an engine provided with a throttle and a throttle control; a power transmission for driving said vehicle from said engine including a fluid power transmitting device, change speed means having a fast speed ratio drive and a slow speed ratio drive, power operated means for operating the change speed means between said drive ratios, means operably associated with said throttle control for controlling said power operated means, said last means constructed and arranged such that said change speed means is conditioned in said slow speed ratio drive when said throttle control is in engine idle position and is responsive to movement of the throttle control from engine idle position to change the speed ratio of said change speed means to said fast speed ratio drive.

43. In a motor vehicle having an engine provided with a throttle and a throttle control; a power transmission for driving said vehicle from said engine including a fluid power transmitting device, change speed means having a fast speed ratio drive and a slow speed ratio drive, power operated means for operating the change speed means between said drive ratios, means operably associated with said throttle control for controlling said power operated means, said last means being constructed and arranged such that said change speed means is conditioned in said slow speed ratio drive in response to operation of said throttle control to engine idle position and to a predetermined position in throttle opening direction.

44. In a power transmission for driving a motor vehicle having an engine provided with an intake manifold, a throttle valve and a driver operable control for adjusting said valve between open and closed position; driving and driven shafts; a change speed mechanism drivingly disposed between said shafts for providing a relatively slow speed ratio drive and a relatively fast speed ratio drive therebetween; servo-motor means for controlling said change speed mechanism; means controlling said servo-motor means and operable in response to manipulation of said valve control to predetermined position in throttle opening direction for obtaining a speed ratio change in said change speed mechanism from a condition of fast speed ratio drive to said slow speed ratio drive, other means controlling said servo-motor means, said other means adapted for operation in response to changes in suction in said manifold and operable upon manipulation of said valve control to predetermined position in throttle closing direction to obtain re-establishment of said fast speed ratio drive in said change speed mechanism and means for releasably holding said servo-motor means control means in its slow speed effecting condition during manipulation of said valve control between its said predetermined position in throttle opening direction and its said predetermined position in throttle closing direction.

45. In a power transmission for driving a motor vehicle having an engine provided with an intake manifold, a throttle valve and a driver operable control for adjusting said valve between open and closed position; driving and driven shafts; a change speed mechanism drivingly disposed between said shafts for providing a relatively slow speed ratio drive and a relatively fast speed ratio drive therebetween; servo-motor means for controlling change speed mechanism; means including a switch controlling said servo-motor means and operable in response to manipulation of said valve control to predetermined position in throttle opening direction for obtaining a speed ratio change in said change speed mechanism from a condition of fast speed ratio drive to said slow speed ratio drive, other means controlling said servo-motor means, said other means including a switch adapted for operation in response to changes in suction in said manifold and operable upon manipulation of said valve control to predetermined position in throttle closing direction to obtain re-establishment of said fast speed ratio drive in said change speed mechanism and means for releasably holding said servo-motor means control means switch in its said slow speed effecting condition during manipulation of said valve control between its said predetermined position in throttle opening direction and its said predetermined position in throttle closing direction.

LUDGER E. LA BRIE.